(12) United States Patent
Yu et al.

(10) Patent No.: US 8,194,688 B2
(45) Date of Patent: Jun. 5, 2012

(54) NODE DISPOSITION APPARATUS, NODE DISPOSITION METHOD AND COMPUTER READABLE MEDIUM THEREOF

(75) Inventors: Chia-Mu Yu, Kaohsiung (TW);
Yu-Shan Liang, Kaohsiung (TW);
Sy-Yen Kuo, Taipei (TW); Chih-Hsiang Ho, Taipei (TW)

(73) Assignee: Institute for Information Industry, Taipei (TW)

( * ) Notice: Subject to any disclaimer, the term of this patent is extended or adjusted under 35 U.S.C. 154(b) by 436 days.

(21) Appl. No.: 12/627,417

(22) Filed: Nov. 30, 2009

(65) Prior Publication Data

US 2011/0116445 A1 May 19, 2011

(30) Foreign Application Priority Data

Nov. 13, 2009 (TW) .............................. 98138577 A

(51) Int. Cl.
*H04L 12/28* (2006.01)
*H04L 12/56* (2006.01)

(52) U.S. Cl. ........................................ 370/408; 370/256
(58) Field of Classification Search .................. 370/256, 370/408, 468, 252, 328
See application file for complete search history.

(56) References Cited

U.S. PATENT DOCUMENTS

| 7,729,295 B2* | 6/2010 | Hibino et al. ................ 370/256 |
| 2007/0116050 A1* | 5/2007 | Hibino et al. ................ 370/468 |

* cited by examiner

*Primary Examiner* — Chuong T Ho
(74) *Attorney, Agent, or Firm* — Skaar Ulbrich Macari, P.A.

(57) ABSTRACT

A node disposition apparatus, a node disposition method and a computer readable medium thereof are provided. The node disposition apparatus may determine where a base station (BS) and a relay station (RS) should be disposed according to a connected mobile station amount of each node disposition candidate position in a non-transparent wireless network. Thereby, the BS and the RS may be disposed effectively to overcome the defects of the conventional BS and RS disposition way.

12 Claims, 7 Drawing Sheets

** NODE DISPOSITION APPARATUS, NODE DISPOSITION METHOD AND COMPUTER READABLE MEDIUM THEREOF

PRIORITY

This application claims priority to Taiwan Patent Application No. 098138577, filed on Nov. 13, 2009, the disclosure of which is incorporated by reference herein in its entirety.

FIELD

The present invention relates to a node disposition apparatus, a node disposition method and a computer readable medium thereof. Specifically, the present invention relates to a node disposition apparatus, a node disposition method and a computer readable medium thereof capable of disposing a node according to a connected mobile station (MS) amount of each node disposition candidate position in a non-transparent wireless network.

BACKGROUND

In terms of the communication distance, wireless network technologies currently available may be classified into a variety of wireless network standards such as WLAN (Wireless Wide Area Network), WMAN (Wireless Metropolitan Area Network), WLAN (Wireless Local Area Network), Bluetooth, Infrared (IR) and so on. Among these wireless network standards, WLAN standards are used the most commonly in people's daily life, for example, in WLAN access points (APs) that obviate the need of wiring, WLAN wireless network cards used in home computers and the like.

Compared to a wired network, a wireless network is more convenient to deploy and has greater mobility in usage, and meanwhile, use of a wireless network may dramatically reduce the cost of manpower and materials that are conventionally needed for the wired network. However, albeit of these advantages, the wireless network still has many limitations such as an instable data transmission range, poor data transmission safety, a low data transmission speed and so on.

When it is desired to deploy a wireless network in a space, in order to overcome these drawbacks of the wireless network, a lot of wireless network nodes are often disposed in the space to form a wireless network whose signal coverage is adequate to cover the whole space. However, a problem involved in deployment of the wireless network is how to deploy the wireless network correctly and completely and allow for all wireless network nodes to transmit data to each other so as to ensure that all data can be transmitted to any position of the space.

Accordingly, there remains a need in the art to provide a solution that can: dispose a wireless network node appropriately in a space to ensure that all wireless network nodes can transmit data to each other; reduce the amount of wireless network nodes that need to be deployed so as to reduce the deployment time and cost; and finally, dispose new wireless network nodes when changes occur to the network traffic or to the amount of wireless network nodes, thereby maximizing the effective signal coverage of the wireless network.

SUMMARY

An objective of certain embodiments of the present invention is to provide a node disposition apparatus for use in a non-transparent wireless network. The node disposition apparatus comprises a storage unit and a microprocessor. The storage unit is electrically connected to the microprocessor and configured to store a first node disposition candidate position and a second node disposition candidate position of the non-transparent wireless network as well as a connected mobile station (MS) amount of each of the node disposition candidate positions. The microprocessor is configured to: determine that the connected MS amount of the first node disposition candidate position is greater than the connected MS amount of the second node disposition candidate position; set the first node disposition candidate position as a first base station (BS) disposition position; subtract a common connected MS amount shared by the first node disposition candidate position and the second node disposition candidate position from the connected MS amount of the second node disposition candidate position to generate a revised connected MS amount of the second node disposition candidate position; determine that the revised connected MS amount of the second node disposition candidate position is unequal to zero to generate a first determination result; and according to the first determination result, set the second node disposition candidate position as a second BS disposition position.

Another objective of certain embodiments of the present invention is to provide a node disposition method for a node disposition apparatus. The node disposition apparatus comprises a microprocessor and a storage unit electrically connected to the microprocessor. The storage unit is configured to store a first node disposition candidate position and a second node disposition candidate position of a non-transparent wireless network as well as a connected MS amount of each of the node disposition candidate positions.

A node disposition method according to certain embodiments of the present invention comprises the steps of: (a) enabling the microprocessor to determine that the connected MS amount of the first node disposition candidate position is greater than the connected MS amount of the second node disposition candidate position; (b) enabling the microprocessor to set the first node disposition candidate position as a first BS disposition position; (c) enabling the microprocessor to subtract a common connected MS amount shared by the first node disposition candidate position and the second node disposition candidate position from the connected MS amount of the second node disposition candidate position to generate a revised connected MS amount of the second node disposition candidate position; (d) enabling the microprocessor to determine that the revised connected MS amount of the second node disposition candidate position is unequal to zero to generate a first determination result; and (e) enabling the microprocessor to set the second node disposition candidate position as a second BS disposition position according to the first determination result.

Further, to accomplish the aforesaid objectives, certain embodiments of the present invention further provide a computer readable medium, which stores a program of a node disposition method for a node disposition apparatus. When the program is loaded into the node disposition apparatus, the aforesaid node disposition method can be accomplished.

Certain embodiments of the present invention may determine on which node disposition candidate position a BS or an RS may be disposed according to the connected MS amount of each node disposition candidate position, so as to make a compromise between the effective signal coverage and the number of wireless network nodes in a non-transparent wireless network. This addresses the need of deploying too many wireless network nodes in order to maximize the effective signal coverage of the non-transparent wireless network, which would otherwise cause a considerable increase in the deployment cost of the wireless network.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

Figure 1:
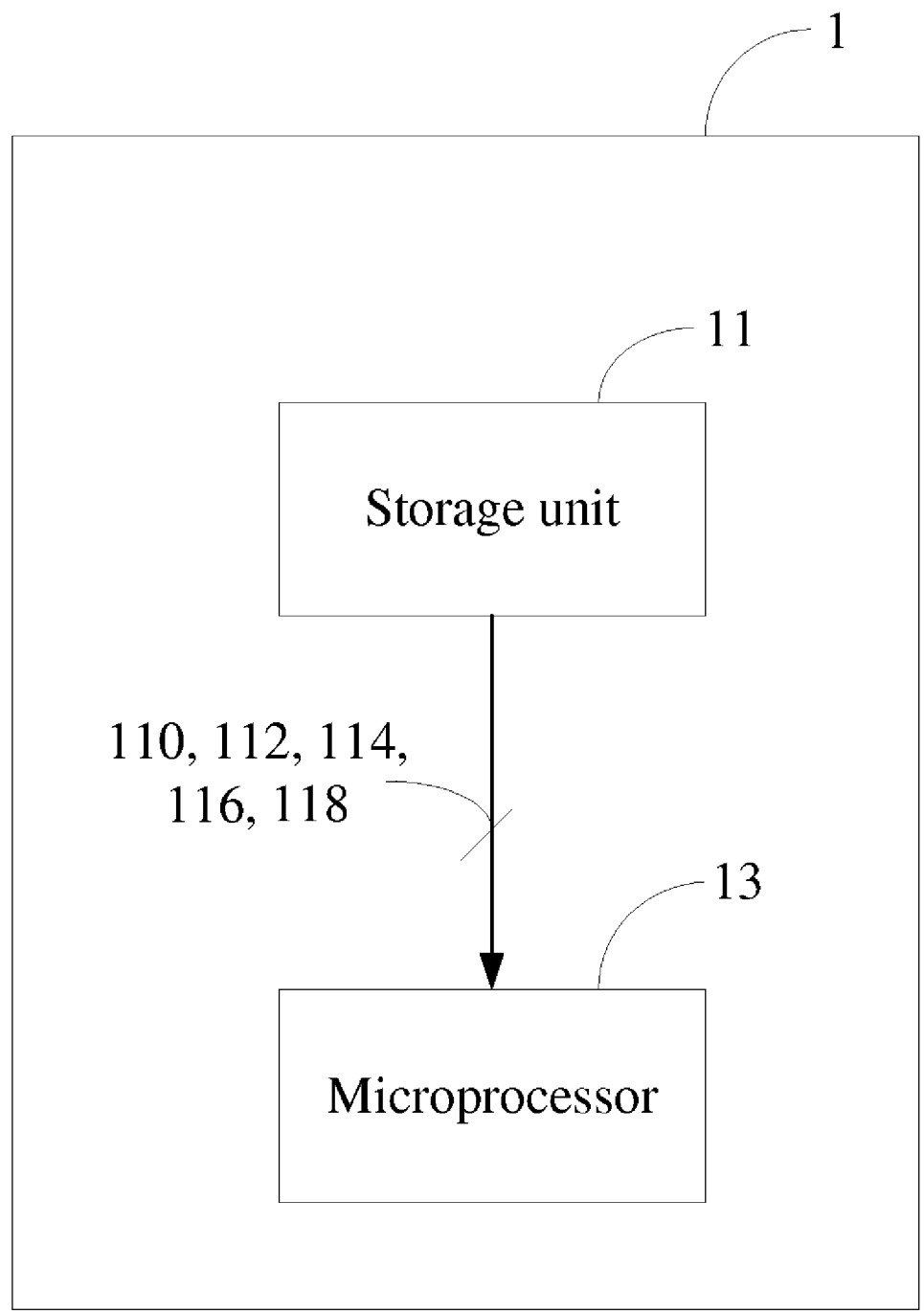
FIG. 1 is a schematic view of a node disposition apparatus according to a first embodiment of the present invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the spirit and scope of the invention as defined by the appended claims.

DETAILED DESCRIPTION

In the following description, the present invention will be explained with reference to embodiments thereof. However, these embodiments are not intended to limit the present invention to any specific environment, applications or particular implementations described in these embodiments. Therefore, description of these embodiments is only for purpose of illustration rather than limits the present invention. It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

A first embodiment of the present invention is shown in FIG. 1, which is a schematic view of a node disposition apparatus 1 for use in a non-transparent wireless network. As can be seen from FIG. 1, the node disposition apparatus 1 comprises a storage unit 11 and a microprocessor 13. The storage unit 11 is electrically connected to the microprocessor 13 and configured to store a first node disposition candidate position 110 and a second node disposition candidate position 112 of the non-transparent wireless network, connected MS amounts 114 and 116 of each of the node disposition candidate positions, and a third node disposition candidate position 118.

Figure 2A:
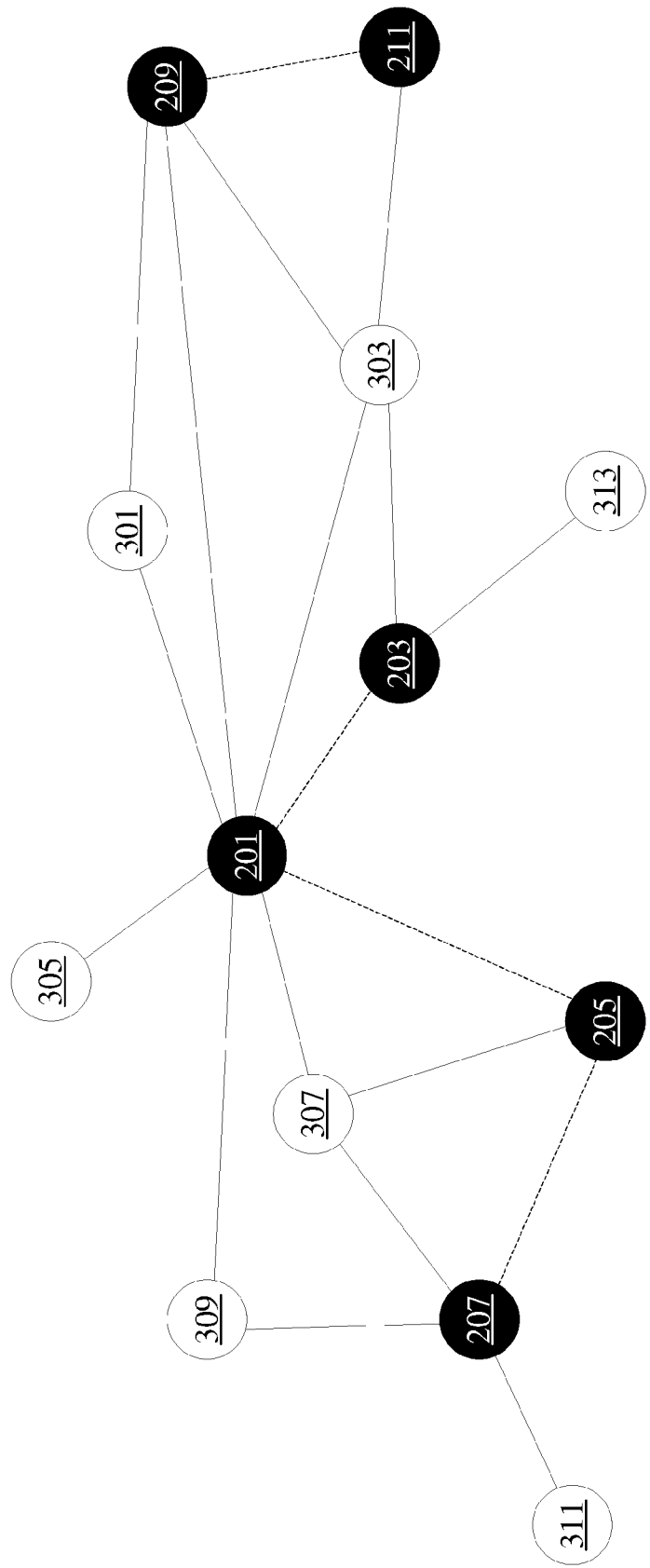
FIGS. 2A-2C are schematic views of a non-transparent wireless network according to the first embodiment.

For convenience of the following description, the non-transparent wireless network, to which the node disposition apparatus 1 is applied, is shown in FIG. 2A. The non-transparent wireless network comprises a plurality of node disposition candidate positions 201, 203, ..., 211 and a plurality of MSs 301, 303, ..., 313. In FIG. 2, a solid line represents that a BS or an RS disposed at the node disposition candidate position may communicate with an adjacent MS, and a dashed line represents that a BS or an RS disposed at the node disposition candidate position may communicate with an adjacent BS or RS.

For example, a BS or an RS, when disposed at the node disposition candidate position 201, may communicate with the MS 301, MS 303, MS 305, MS 307, and MS 309 as well as BSs or RSs disposed at the node disposition candidate positions 203 and 205. In other words, the MS 301, MS 303, MS 305, MS 307, and MS 309 as well as BSs or RSs disposed at the node disposition candidate positions 203 and 205 may all be considered to be within the signal coverage of the node disposition candidate position 201.

For convenience of the following description, in this embodiment, the first node disposition candidate position 110, the second node disposition candidate position 112 and the third node disposition candidate position 118 stored in the storage unit 11 as well as the MSs correspond to the node disposition candidate position 201, the node disposition candidate position 207 and the node disposition candidate position 203 as well as the MSs 301, 303, ..., 313 shown in FIG. 2 respectively. In order for all the MSs in FIG. 2A to be covered by the signal coverage of the BSs or the RSs, the node disposition apparatus 1 will perform the following processes.

Firstly, the microprocessor 13 of the node disposition apparatus 1 is configured to determine which one of the node disposition candidate positions 201, 203, ..., 211 has the greatest connected MS amount. As can be seen from FIG. 2A, the connected MS amounts of the node disposition candidate positions 201, 203, ..., 211 are 5, 2, 1, 3, 2 and 1 respectively. Therefore, the microprocessor 13 determines that the node disposition candidate position 201 has the greatest connected MS amount.

In other words, if a BS or an RS is disposed at the node disposition candidate position 201, signal coverage thereof may cover all of the MSs 301, 303, 305, 307 and 309 to deliver the best deployment effectiveness. Hence, the microprocessor 13 sets the node disposition candidate position 201 as a first BS disposition position, and subtracts a common connected MS amount shared with the node disposition candidate position 201 respectively from the respective connected MS amount of each of the node disposition candidate positions 203, ..., 211 to generate a revised connected MS amount respectively.

Figure 2B:
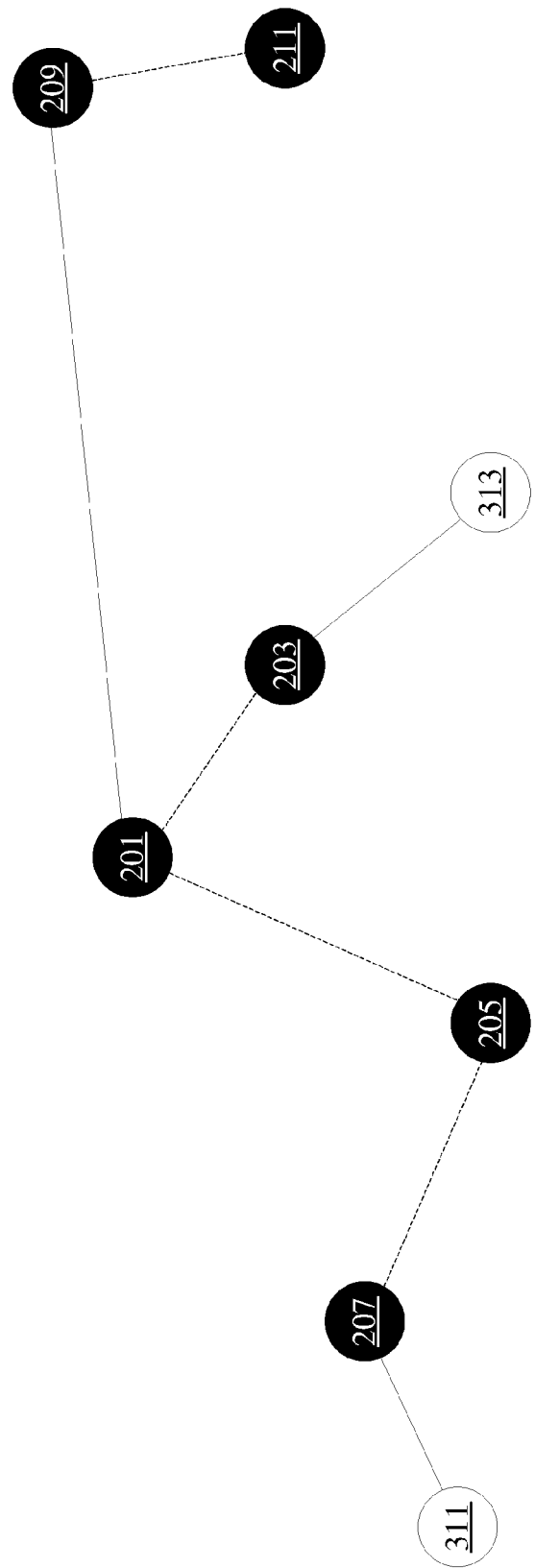

More specifically, referring to FIG. 2B, a schematic view of a non-transparent wireless network after the common connected MS amounts are subtracted is shown therein. As can be seen from FIG. 2B, the revised connected MS amounts of the node disposition candidate positions 203, ..., 211 after the common MS amounts are subtracted are 1, 0, 1, 0 and 0. As there are still some revised connected MS amounts that are unequal to 0, the microprocessor 13 determines that there are still MSs (i.e., the MSs 311 and 313) not covered by the signal coverage to generate a first determination result, and continues to determine which one of the node disposition candidate positions 203, ..., 211 has the greatest revised connected MS amount.

As can be seen from FIG. 2B, both the node disposition candidate position 203 and the node disposition candidate position 207 have a revised connected MS amount of 1, so the microprocessor 13 choose one of the node disposition candidate position 203 and the node disposition candidate position 207 randomly for subsequent processes. Here, it is presumed that the node disposition candidate position 207 is chosen. Then, the microprocessor 13 will determine whether the node disposition candidate position 207 is located within signal coverage of a node disposition candidate position. If not, then the microprocessor 13 generates a second determination result and sets the node disposition candidate position 207 as a second BS disposition position according to the first determination result and the second determination result.

If the microprocessor 13 determines that the node disposition candidate position 207 is located within signal coverage of a node disposition candidate position (i.e., the node disposition candidate position 201), it also generates a second determination result and sets the node disposition candidate position 207 as a RS disposition position according to the first determination result and the second determination result. In general, a BS provides better signal quality but has higher cost than a RS; so in order to reduce the disposition cost in this embodiment, a RS will be disposed at a node disposition candidate position only if the node disposition candidate position is located within signal coverage of a BS. Of course, in other embodiments, a BS may also be disposed at the node disposition candidate position 207 depending on practical conditions, and the present invention is not merely limited thereto.

As can be seen from FIG. 2B, the node disposition candidate position 207 is not located within signal coverage of the node disposition candidate position 201, so a BS will be disposed at the node disposition candidate position 207. Once the BS is disposed at the node disposition candidate position 207, the microprocessor 13 subtracts a common connected MS amount shared with the node disposition candidate position 207 respectively from the respective connected MS amount of each of the node disposition candidate positions 203, 205, 209, 211 to generate a revised connected MS amount respectively.

Figure 2C:
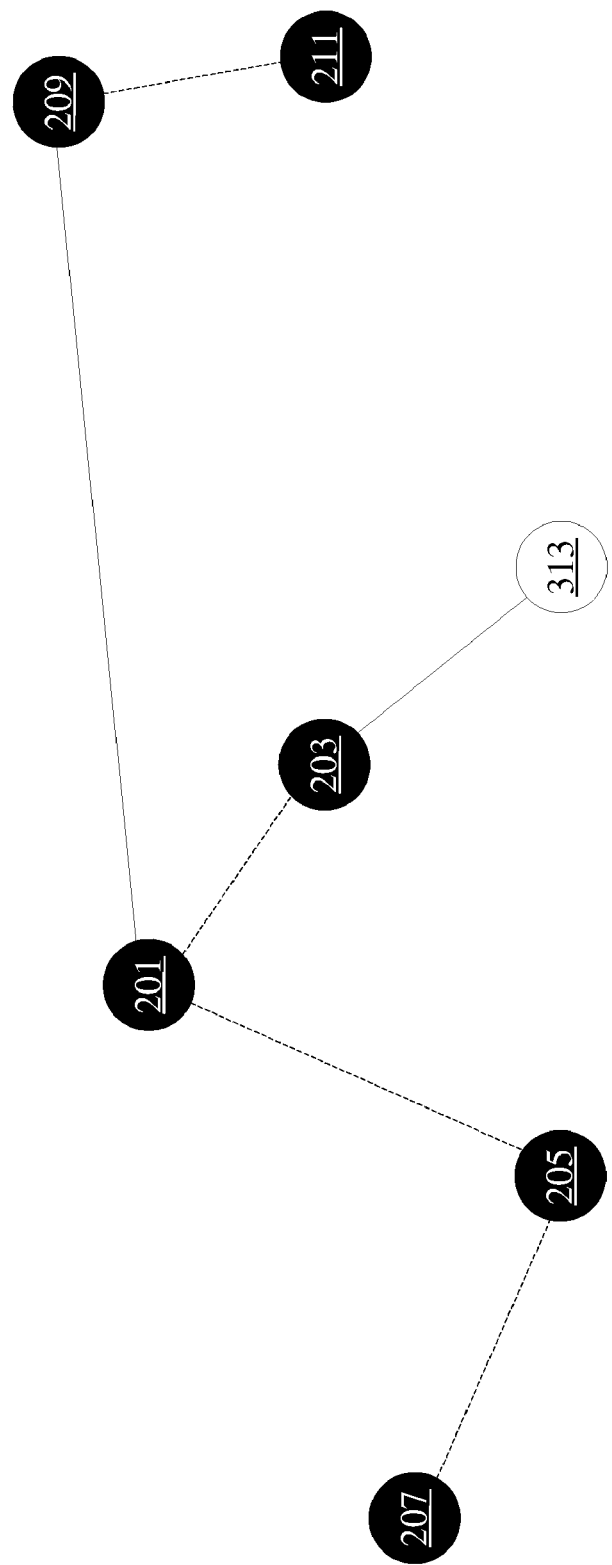

More specifically, referring to FIG. 2C, a schematic view of the non-transparent wireless network after the common connected MS amounts are subtracted is shown therein. As can be seen from FIG. 2C, after the common connected MS amounts are subtracted, the revised connected MS amounts of the node disposition candidate positions 203, 205, 209, 211 are 1, 0, 0 and 0 respectively. As there is still a revised connected MS amount that is unequal to 0, the microprocessor 13 determines that there is still a MS (i.e., the MS 313) that is not covered by the signal coverage, and continues to determine which one of the node disposition candidate positions 203, 205, 209, 211 has the greatest revised connected MS amount.

As can be seen from FIG. 2C, the node disposition candidate position 203 has a revised connected MS amount that is equal to 1, so the microprocessor 13 determines whether the node disposition candidate position 203 is located within signal coverage of a node disposition candidate position. In the case shown in FIG. 2C, the microprocessor 13 must determine that the node disposition candidate position 203 is located within signal coverage of the node disposition candidate position 201 to generate a second determination result, and sets the node disposition candidate position 203 as a RS disposition position according to the first determination result and the second determination result. Thus, the node disposition in the non-transparent wireless network is completed.

On the other hand, to reduce the node disposition cost, the microprocessor 13 of the disposition apparatus 1 may also dispose a node in the following way. In more detail, once the node disposition candidate position 207 is chosen randomly, the microprocessor 13 of the node disposition apparatus 1 will determine whether the node disposition candidate position is located within signal coverage of a third node disposition candidate position according to the second determination result to generate a third determination result.

For example, as can be seen from FIG. 2B, the node disposition candidate position 207 is located within signal coverage of the node disposition candidate position 205, so the third determination result indicates that the node disposition candidate position 207 is located within signal coverage of the third node disposition candidate position (i.e. the node disposition candidate position 205). Additionally, as the node disposition candidate position 205 is located within signal coverage of the node disposition candidate position 201, the microprocessor 13 of the node disposition apparatus 1 sets the node disposition candidate position 207 and the node disposition candidate position 205 as a RS disposition position respectively according to the first determination result, the second determination result and the third determination result. Thus, the BS disposed at the node disposition candidate position 201 may communicate with the MS 311 via the RSs disposed at the node disposition candidate position 207 and the node disposition candidate position 205.

Figure 3A:
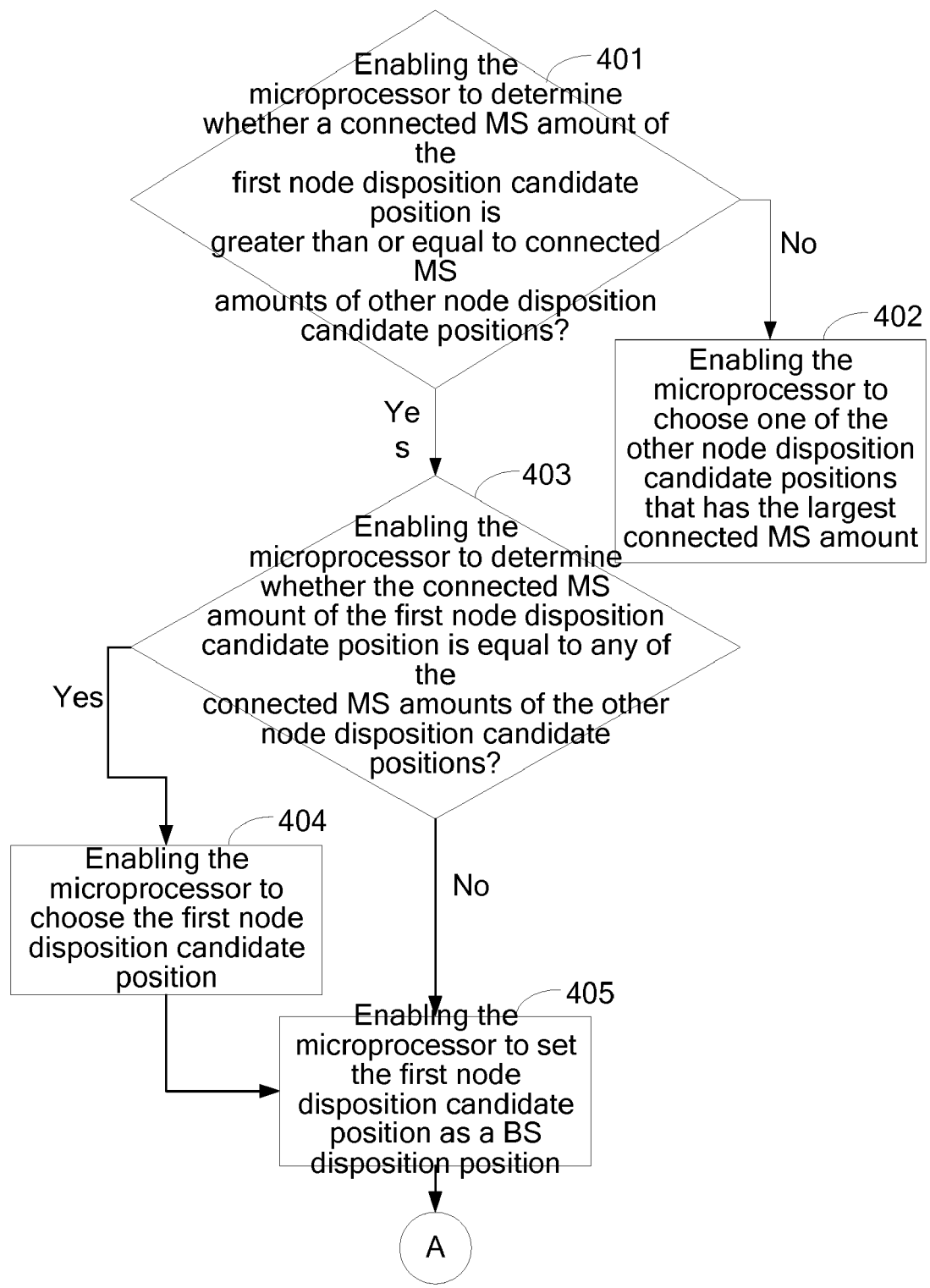
FIGS. 3A-3C are a flowchart according to a second embodiment of the present invention.
Figure 3B:
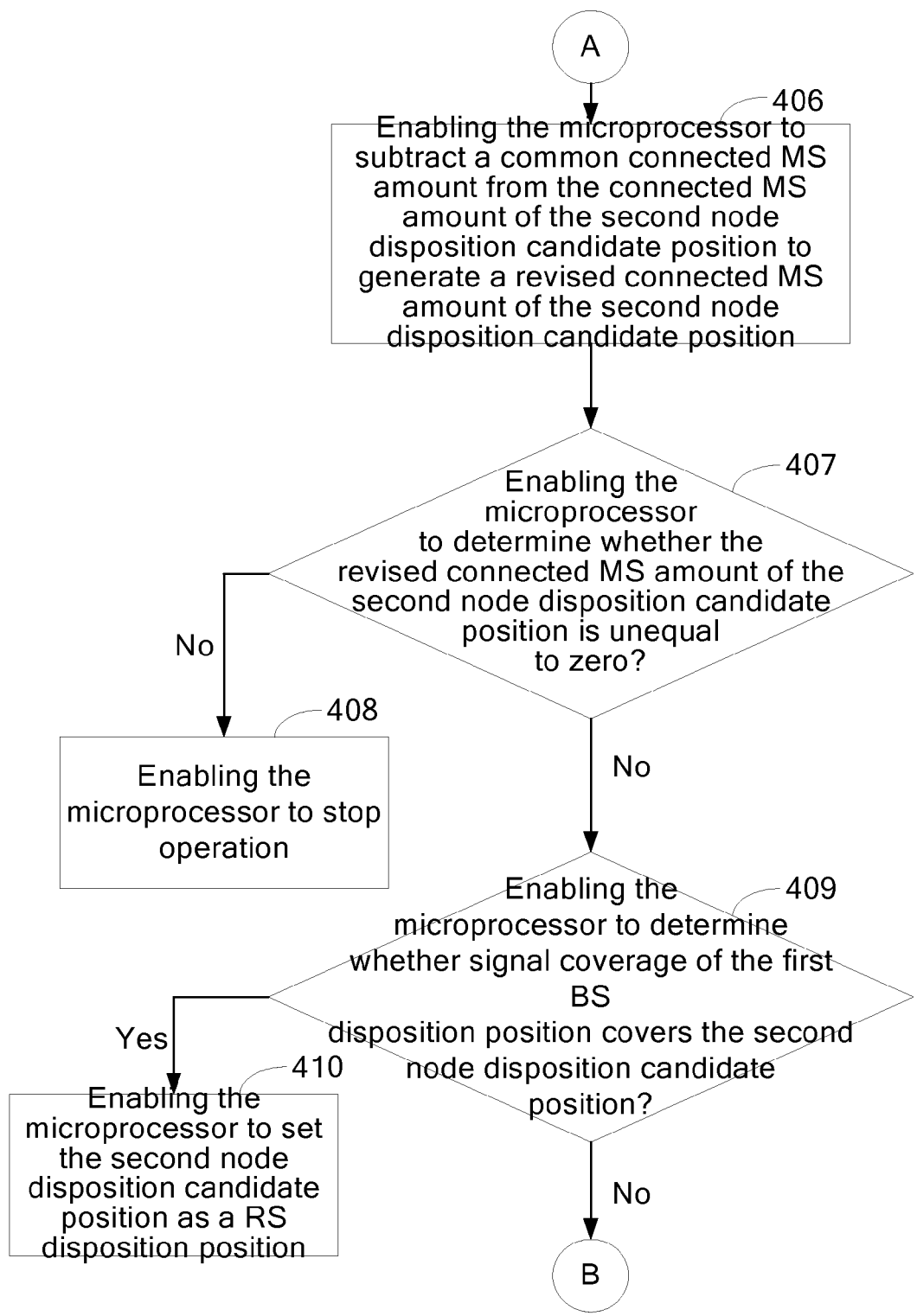
Figure 3C:
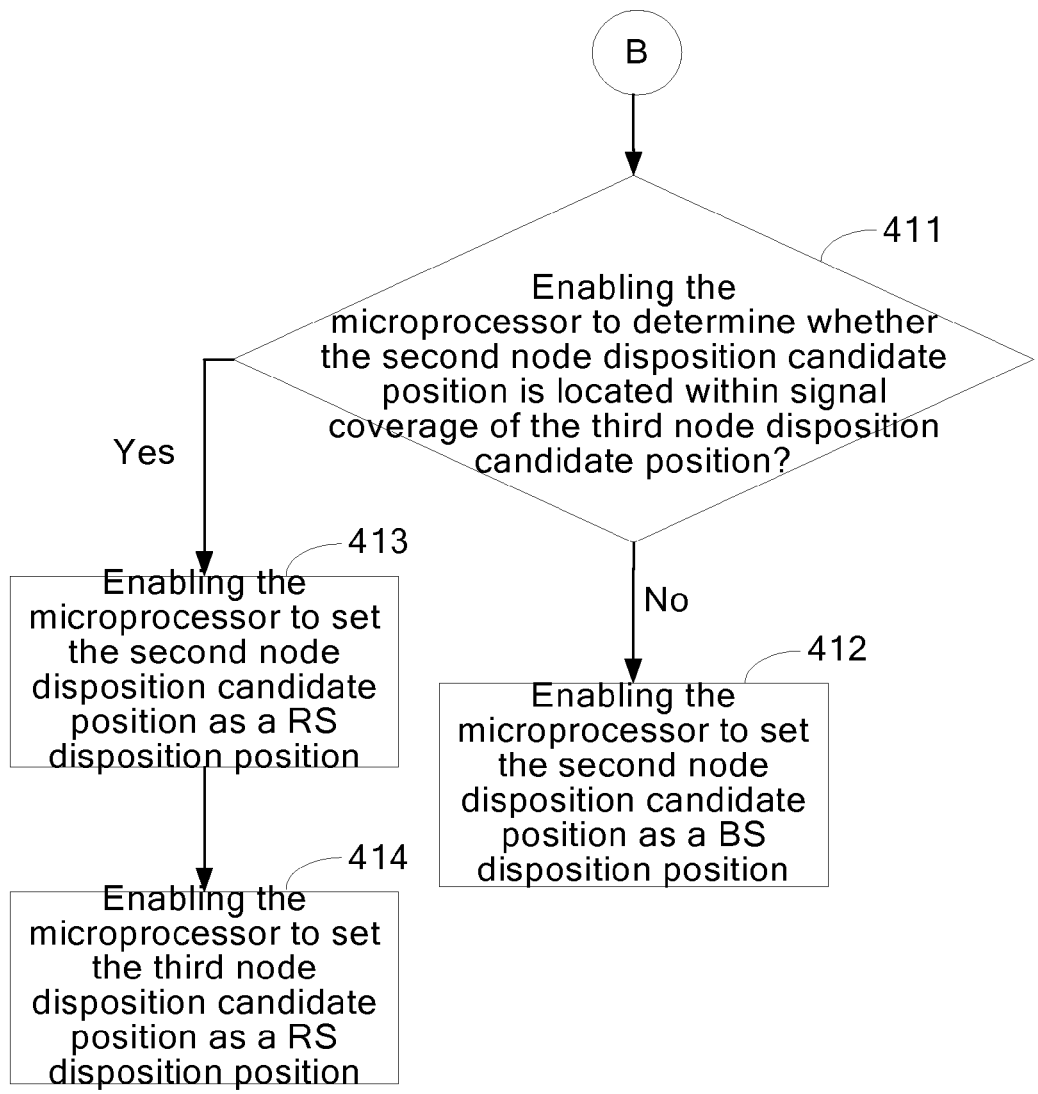

FIGS. 3A-3C show a second embodiment of the present invention, which is a node disposition method for use in the node disposition apparatus as described in the first embodiment. The node disposition apparatus comprises a microprocessor and a storage unit electrically connected with the microprocessor. The storage unit is configured to store a first node disposition candidate position and a second node disposition candidate position of a non-transparent wireless network, a connected MS amount of each of the node disposition candidate positions and a third node disposition candidate position. The third node disposition candidate position is located within signal coverage of the first BS disposition position.

Besides, the node disposition method of the second embodiment may be implemented by a computer readable medium which, when being loaded into the node disposition apparatus via a computer and a plurality of codes contained therein is executed, can accomplish the node disposition method of the second embodiment. The computer readable medium may be stored in a tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

The node disposition method of the second embodiment comprises the following steps. Referring to FIG. 3A, step 401 is executed at first to enable the microprocessor to determine whether a connected MS amount of the first node disposition candidate position is greater than or equal to connected MS amounts of other node disposition candidate positions. If not, step 402 is executed to enable the microprocessor to choose one of the other node disposition candidate positions that has the greatest connected MS amount.

If it is determined in step 401 that the connected MS amount of the first node disposition candidate position is greater than or equal to the connected MS amounts of the other node disposition candidate positions, then step 403 is executed to enable the microprocessor to determine whether the connected MS amount of the first node disposition candidate position is equal to any of the connected MS amounts of the other node disposition candidate positions. If yes, then step 404 is executed to enable the microprocessor to choose the first node disposition candidate position.

Upon completion of step 404 or if it is determined in step 403 that the connected MS amount of the first node disposition candidate position is unequal to any of the connected MS amounts of the other node disposition candidate positions, then step 405 is executed to enable the microprocessor to set the first node disposition candidate position as a BS disposition position. Next, referring to FIG. 3B, step 406 is executed to enable the microprocessor to subtract a common connected MS amount shared by the first node disposition candidate position and the second node disposition candidate position from the connected MS amount of the second node disposition candidate position to generate a revised connected MS amount of the second node disposition candidate position.

Afterwards, step 407 is executed to enable the microprocessor to determine whether the revised connected MS amount of the second node disposition candidate position is unequal to zero. If not, then step 408 is executed to enable the microprocessor to stop operation. Otherwise, if it is determined in step 407 that the revised connected MS amount of the second node disposition candidate position is unequal to zero, then step 409 is executed to enable the microprocessor to determine whether signal coverage of the first BS disposition position covers the second node disposition candidate position. If yes, then step 410 is executed to enable the microprocessor to set the second node disposition candidate position as a RS disposition position.

If it is determined in step 409 that the signal coverage of the first BS disposition position does not cover the second node disposition candidate position, then referring to FIG. 3C, step 411 is executed to enable the microprocessor to determine whether the second node disposition candidate position is located within signal coverage of the third node disposition candidate position. If not, then step 412 is executed to enable the microprocessor to set the second node disposition candidate position as a BS disposition position.

If it is determined in step 411 that the second node disposition candidate position is located within signal coverage of the third node disposition candidate position, then step 413 is executed to enable the microprocessor to set the second node disposition candidate position as an RS disposition position. Finally, step 414 is executed to enable the microprocessor to set the third node disposition candidate position as an RS disposition position.

In addition to the aforesaid steps, the second embodiment can also execute all the operations and functions set forth in the first embodiment. How the second embodiment executes these operations and functions will be readily appreciated by those of ordinary skill in the art based on the explanation of the first embodiment, and thus will not be further described herein.

Certain embodiments of the disclosed invention may determine on which node disposition candidate position a BS or a RS may be disposed according to the connected MS amount of each node disposition candidate position, so as to make a compromise between the effective signal coverage and the number of wireless network nodes in a non-transparent wireless network. This obviates the need of deploying too many wireless network nodes in order to maximize the effective signal coverage of the non-transparent wireless network, which would otherwise cause a considerable increase in the deployment cost of the wireless network.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A node disposition method for a node disposition apparatus, the node disposition apparatus comprising a microprocessor and a storage unit electrically connected to the microprocessor, the storage unit being configured to store a first node disposition candidate position and a second node disposition candidate position of a non-transparent wireless network as well as a connected mobile station (MS) amount of each of the node disposition candidate positions, the node disposition method comprising the steps of:
   (a) enabling the microprocessor to determine that the connected MS amount of the first node disposition candidate position is greater than the connected MS amount of the second node disposition candidate position;
   (b) enabling the microprocessor to set the first node disposition candidate position as a first base station (BS) disposition position;
   (c) enabling the microprocessor to subtract a common connected MS amount shared by the first node disposition candidate position and the second node disposition candidate position from the connected MS amount of the second node disposition candidate position to generate a revised connected MS amount of the second node disposition candidate position;
   (d) enabling the microprocessor to determine that the revised connected MS amount of the second node disposition candidate position is unequal to zero to generate a first determination result; and
   (e) enabling the microprocessor to set the second node disposition candidate position as a second BS disposition position according to the first determination result.

2. The node disposition method of claim 1, further comprising the steps of:
   (f) enabling the microprocessor to, according to the first determination result, determine that signal coverage of the first BS disposition position does not cover the second node disposition candidate position to generate a second determination result; and
   (g) enabling the microprocessor to set the second node disposition candidate position as the second BS disposition position according to the first determination result and the second determination result.

3. The node disposition method of claim 1, further comprising the steps of:
   enabling the microprocessor to, according to the first determination result, determine that signal coverage of the first BS disposition position covers the second node disposition candidate position to generate a second determination result; and
   enabling the microprocessor to set the second node disposition candidate position as a relay station (RS) disposition position according to the first determination result and the second determination result.

4. The node disposition method of claim 2, wherein the storage unit is further configured to store a third node disposition candidate position which is located within the signal coverage of the first BS disposition position, the node disposition method further comprising the steps of:
   subsequent to the step (f), enabling the microprocessor to, according to the second determination result, determine that the second node disposition candidate position is located within signal coverage of the third node disposition candidate position to generate a third determination result; and
   enabling the microprocessor to set the second node disposition candidate position and the third node disposition candidate position as a RS disposition position respectively according to the first determination result, the second determination result and the third determination result.

5. A node disposition apparatus for use in a non-transparent wireless network, comprising:
   a storage unit, being configured to store a first node disposition candidate position and a second node disposition candidate position of the non-transparent wireless network as well as a connected MS amount of each of the node disposition candidate positions; and a microprocessor, being electrically connected to the storage unit and configured to:
   determine that the connected MS amount of the first node disposition candidate position is greater than the connected MS amount of the second node disposition candidate position;
   set the first node disposition candidate position as a first BS disposition position;
   subtract a common connected MS amount shared by the first node disposition candidate position and the second node disposition candidate position from the connected MS amount of the second node disposition candidate position to generate a revised connected MS amount of the second node disposition candidate position;
   determine that the revised connected MS amount of the second node disposition candidate position is unequal to zero to generate a first determination result; and
   set the second node disposition candidate position as a second BS disposition position according to the first determination result.

6. The node disposition apparatus of claim 5, wherein the microprocessor is further configured to:
   according to the first determination result, determine that signal coverage of the first BS disposition position does not cover the second node disposition candidate position to generate a second determination result; and
   set the second node disposition candidate position as the second BS disposition position according to the first determination result and the second determination result.

7. The node disposition apparatus of claim 5, wherein the microprocessor is further configured to:
   according to the first determination result, determine that signal coverage of the first BS disposition position covers the second node disposition candidate position to generate a second determination result; and
   set the second node disposition candidate position as a RS disposition position according to the first determination result and the second determination result.

8. The node disposition apparatus of claim 6, wherein:
   the storage unit is further configured to store a third node disposition candidate position which is located within the signal coverage of the first BS disposition position; and
   the microprocessor is further configured to:
      according to the second determination result, determine that the second node disposition candidate position is located within signal coverage of the third node disposition candidate position to generate a third determination result; and
      set the second node disposition candidate position and the third node disposition candidate position as a RS disposition position respectively according to the first determination result, the second determination result and the third determination result.

9. A non-transitory computer readable medium, storing a program of a node disposition method for a node disposition apparatus, the node disposition apparatus comprising a microprocessor and a storage unit electrically connected to the microprocessor, the storage unit being configured to store a first node disposition candidate position and a second node disposition candidate position of a non-transparent wireless network as well as a connected MS amount of each of the node disposition candidate positions, wherein when being loaded into the node disposition apparatus via a computer, the program executes:
   a code for enabling the microprocessor to determine that the connected MS amount of the first node disposition candidate position is greater than the connected MS amount of the second node disposition candidate position;
   a code for enabling the microprocessor to set the first node disposition candidate position as a first BS disposition position;
   a code for enabling the microprocessor to subtract a common connected MS amount shared by the first node disposition candidate position and the second node disposition candidate position from the connected MS amount of the second node disposition candidate position to generate a revised connected MS amount of the second node disposition candidate position;
   a code for enabling the microprocessor to determine that the revised connected MS amount of the second node disposition candidate position is unequal to zero to generate a first determination result; and
   a code for enabling the microprocessor to set the second node disposition candidate position as a second BS disposition position according to the first determination result.

10. The non-transitory computer readable medium of claim 9, wherein the program further executes:
   a code for enabling the microprocessor to, according to the first determination result, determine that signal coverage of the first BS disposition position does not cover the second node disposition candidate position to generate a second determination result; and
   a code for enabling the microprocessor to set the second node disposition candidate position as the second BS disposition position according to the first determination result and the second determination result.

11. The non-transitory computer readable medium of claim 9, wherein the program further executes:
   a code for enabling the microprocessor to, according to the first determination result, determine that signal coverage of the first BS disposition position covers the second node disposition candidate position to generate a second determination result; and
   a code for enabling the microprocessor to set the second node disposition candidate position as a RS disposition position according to the first determination result and the second determination result.

12. The non-transitory computer readable medium of claim 10, wherein the storage unit is further
   configured to store a third node disposition candidate position which is located within the
   signal coverage of the first BS disposition position, and wherein the program further executes:
   a code for enabling the microprocessor to, according to the second determination result, determine that the second node disposition candidate position is located within signal coverage of the third node disposition candidate position to generate a third determination result; and
   a code for enabling the microprocessor to set the second node disposition candidate position and the third node disposition candidate position as a RS disposition position respectively according to the first determination result, the second determination result and the third determination result.

* * * * *